Sept. 23, 1952  W. GUZEY, JR., ET AL  2,611,579
VEHICLE LIFT
Filed May 28, 1951  3 Sheets-Sheet 1
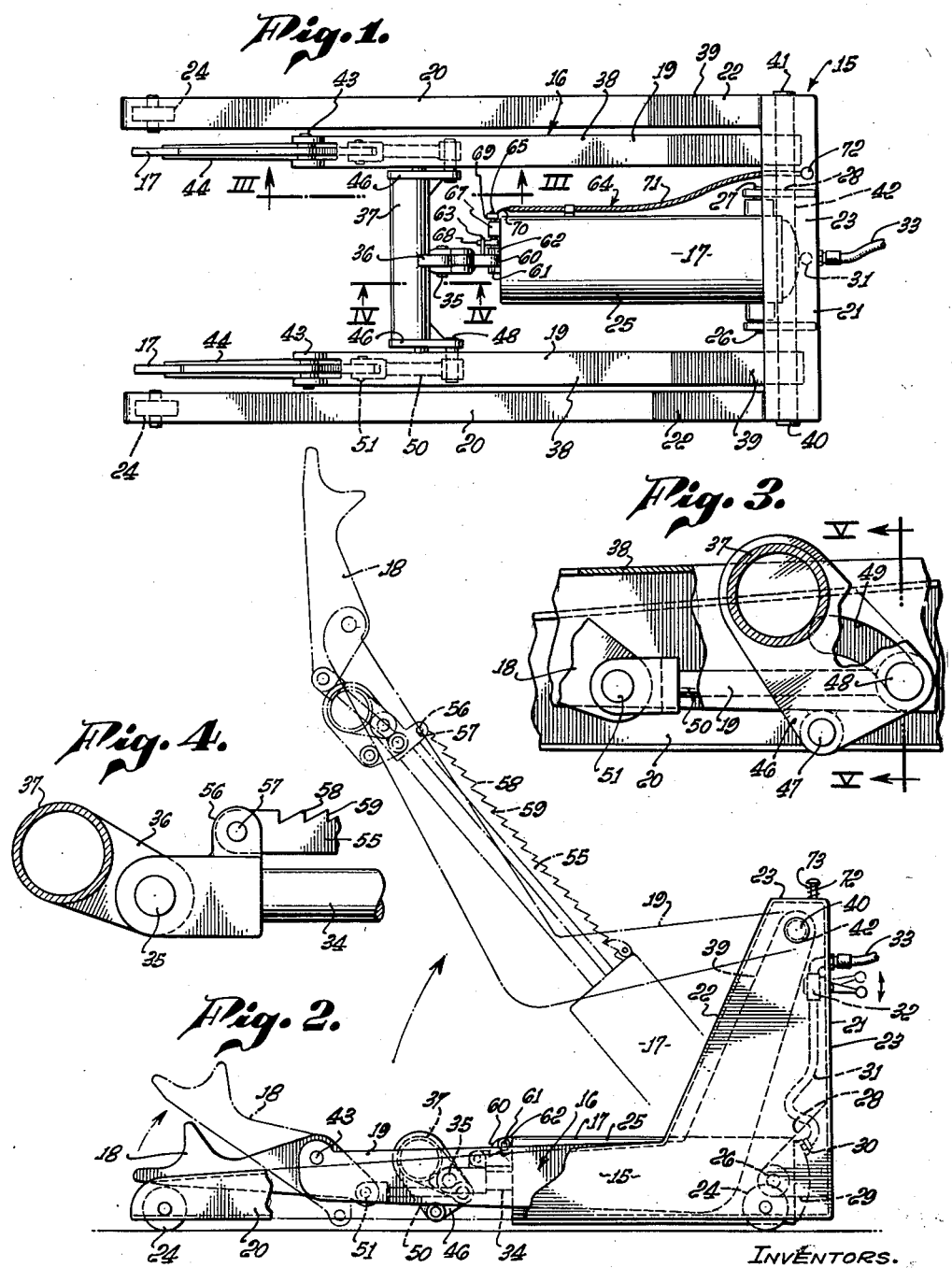
INVENTORS.
WILLIAM GUZEY, JR.
JOHN CURLETT,
JAMES F. McKINEY,
BY
ATTORNEY.

Sept. 23, 1952 W. GUZEY, JR., ET AL 2,611,579
VEHICLE LIFT
Filed May 28, 1951 3 Sheets-Sheet 2
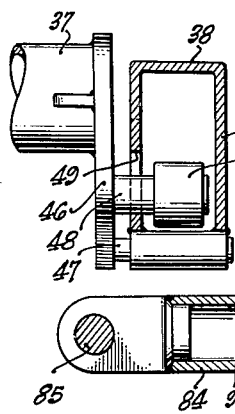
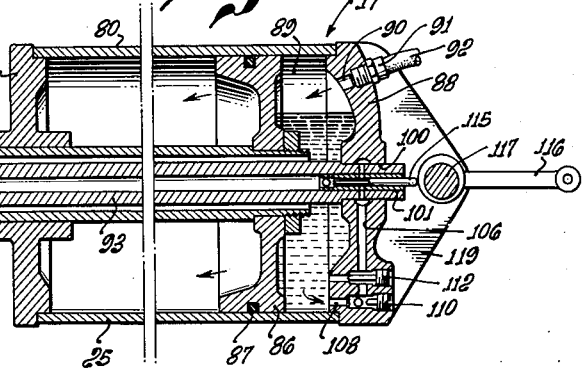
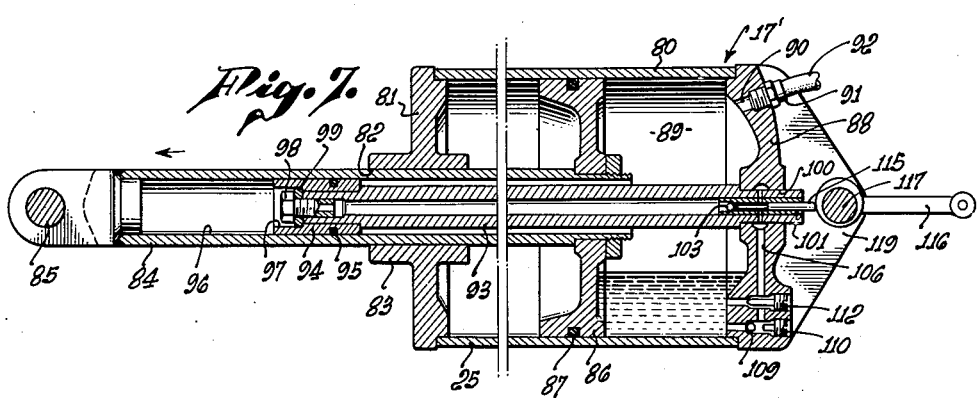
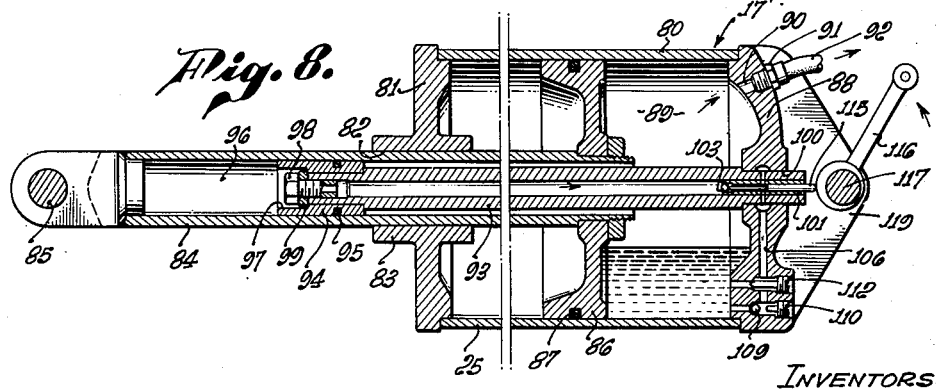
INVENTORS.
WILLIAM GUZEY, JR.
JOHN CURLETT,
JAMES F. McKINEY,
BY
ATTORNEY.

Sept. 23, 1952 W. GUZEY, JR., ET AL 2,611,579
VEHICLE LIFT
Filed May 28, 1951 3 Sheets-Sheet 3
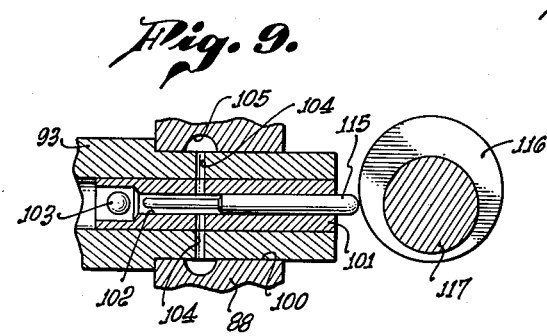
Fig. 9.
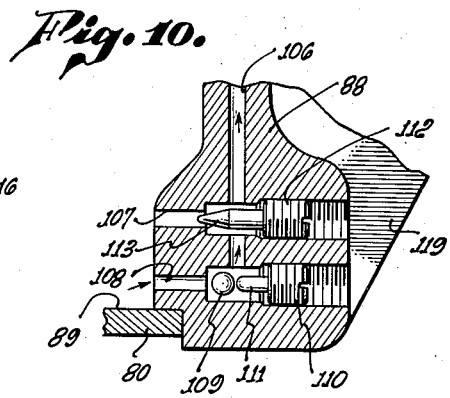
Fig. 10.
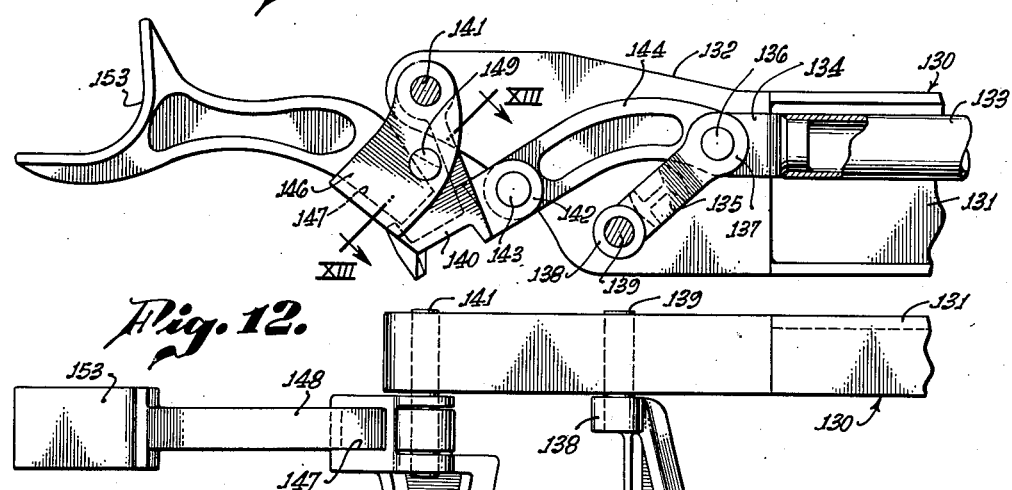
Fig. 11.
Fig. 12.
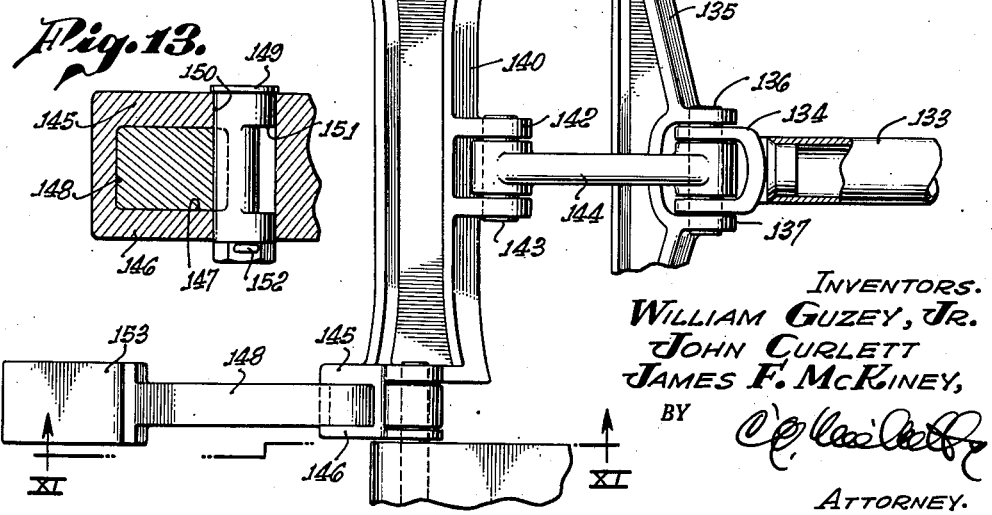
Fig. 13.
INVENTORS.
WILLIAM GUZEY, JR.
JOHN CURLETT
JAMES F. McKINEY,
BY
ATTORNEY.

Patented Sept. 23, 1952

2,611,579

UNITED STATES PATENT OFFICE 2,611,579

VEHICLE LIFT

William Guzey, Jr., Van Nuys, John Curlett, North Hollywood, and James F. McKiney, Bell Gardens, Calif., assignors, by direct and mesne assignments, to Miller Manufacturing Co. Inc., Los Angeles, Calif., a corporation of California Application May 28, 1951, Serial No. 228,712

16 Claims. (Cl. 254—8)

1

This invention relates to an improved, portable lift for vehicles. More particularly this invention relates to a vehicle lift so constructed as to permit its introduction beneath a low-slung overhanging vehicle body for engagement with the rear axle thereof or the chasis thereof in order to lift one end of the vehicle to a suitable convenient working height.

Prior proposed vehicle lifts which included spaced lifting arms are subject to various objections and disadvantages when employed to lift modern vehicles having a relatively long distance between the rear axle and the rear bumper with a low-slung gas tank carried therebetween. While the length of the lifting arms of proposed prior lifts may be sufficient to reach a position below a vehicle axle, raising of the arms on proposed lifts to make contact with the axle is obstructed by contact of the arms with the gas tank or other low-slung vehicle body parts. Thus lifting of the vehicle is not possible without causing damage to the gas tank. It is not feasible to space the lifting arms a distance far enough apart to straddle the tank because such a wide span will not only require excessive interconnecting means between the arms to prevent lateral sway of the arms with respect to each other, but also because of the costs involved in a larger cumbersome vehicle lift. There is thus a definite need for a vehicle lift which is capable of making initial contact with the vehicle axle before the main portion of the lifting means is elevated out of its normal horizontal position so that the vehicle may be first raised to a selected height before the main portion of the lifting arms are raised.

The primary object of this invention is to design and provide an improved vehicle lift which is designed for novel operation in the lifting of one end of a vehicle.

Another object of this invention is to design and provide an improved vehicle lift wherein means are provided for making an initial contact with a vehicle axle and for initially lifting said vehicle before the main lifting arms are actuated out of normal non-lifting position.

A further object of this invention is to design and provide an improved vehicle lift wherein articulated lifting means are operable in sequential order for raising one end of a vehicle.

Still another object of this invention is to provide a portable vehicle lift wherein articulated lifting means are so constructed and operable that the portion of the lifting means below low-slung portions of the vehicle remain in normal

2 position while the vehicle is being initially lifted by portions of the lifting means disposed adjacent to the part of the vehicle to be engaged.

This invention contemplates a portable vehicle lift having articulated lifting means wherein power means for actuation of the lifting means are connected thereto in novel manner.

A further object of this invention is to provide a portable vehicle lift having articulated lifting means wherein safety means are provided for positively holding the lifting arms in selected raised position.

This invention also contemplates a portable vehicle lift having articulated lifting arms actuated by power means in a novel manner and wherein safety means including hydraulic locking means associated with the power means are provided for positively holding the lifting arms in selected raised position.

Generally speaking, this invention contemplates an improved vehicle lift which comprises a frame structure pivotally carrying a pair of spaced parallel forwardly extending articulated lifting arms, each arm including a forwardly extending finger or extension which is adapted to be raised into contact with a vehicle axle without raising the main portion of the lifting arm. The lifting arms are interconnected by means including a cross-member pivotally connected thereto, said cross-member having a pivotal connection to the forward end of a piston rod carried by a power means pivotally connected to the frame structure at one end. The cross-member is connected to each lifting finger by novel lever means so arranged that the lifting fingers are first raised and then the main portion of the lifting arms are raised about their pivotal connection to the frame structure. Releasable safety means carried by the power means are provided for positively holding the lifting arms in selected elevated position.

Other objects and advantages of this invention will become clear from the following description of the drawings.

In the drawings:

Fig. 1 is a top view of a vehicle lift embodying this invention.

Fig. 2 is a side view of the lift shown in Fig. 1, the phantom lines indicating the position of the lifting arms in raised position and also the position of the lifting extensions in initial raised position.

Fig. 3 is a fragmentary enlarged view, taken in a vertical plane, indicated by the line III—III of Fig. 1.

Fig. 4 is an enlarged view taken in the plane indicated by line IV—IV of Fig. 1.

Fig. 5 is an enlarged fragmentary view, taken in the vertical transverse plane indicated by line V—V of Fig. 3.

Fig. 6 is a longitudinal sectional view of a power means used with the embodiment of the invention shown in Fig. 1.

Fig. 7 is a sectional view of the power means shown in Fig. 6 showing the piston in extended lifting position.

Fig. 8 is a sectional view of the power means shown in Fig. 6 showing the power means in operable release position.

Fig. 9 is a fragmentary enlarged sectional view of the release means carried by the power means shown in Fig. 6.

Fig. 10 is a fragmentary enlarged view of the cylinder head used with the power means shown in Fig. 6.

Fig. 11 is a fragmentary elevational view of a modified lever means for actuating the lifting fingers, the view being taken in a vertical plane indicated by the line XI—XI of Fig. 12.

Fig. 12 is a fragmentary top plan view of the modified lever means shown in Fig. 11.

Fig. 13 is an enlarged fragmentary sectional view taken on the plane indicated by line XIII—XIII of Fig. 11.

The vehicle auto lift shown in Fig. 1 comprises a frame structure generally indicated at 15, a pair of spaced articulated vehicle lifting means generally indicated at 16 pivotally connected to the frame structure 15, a power means 17, and means for connecting the power means to the lifting means in such a manner that lifting extensions or fingers 18 may be initially raised to lifting position and thereafter lifting arms 19 are actuated into raised position as shown in Fig. 2.

The frame structure 15 includes a pair of parallel spaced generally horizontal frame members 20, each preferably formed of box or rectangular cross-section. It is understood, however, that frame members 20 may be formed of channel section, I-section or any other suitable structural cross-section capable of performing the function of the frame structure. At one end of the lift the frame members 20 are interconnected by an upstanding back generally indicated at 21. Back 21 may comprise an upstanding box cross-section tapering portion 22 secured to each frame member as by welding and interconnected by a transverse wall 23. The frame structure 15 is provided with front and rear wheel and axle assemblies generally indicated at 24.

The power means 17 may comprise a normally horizontal forwardly extending cylinder 25, said cylinder being pivotally connected at 26 to the frame structure 15 between members 20. The pivotal connection 26 includes oppositely extending trunnions 27 on the cylinder journably mounted in spaced vertical brackets 28 secured as by welding to back wall 23 and connected by a transverse horizontal member 29. The power means 17 as shown in Figs. 1 and 2 may include any suitable fluid pressure operated cylinder 25 and cooperative piston head (not shown). The cylinder 25 is provided with a fitting 30 for making a suitable connection to a conduit 31 provided with a fluid pressure control valve 32 of any well-known make for releasably controlling supply of fluid pressure to the cylinder from a suitable supply source connected to the valve by a hose 33.

Forwardly directed piston rod 34 projects outwardly from a forward ported end wall of cylinder 25 and is pivotally connected at 35 to a pair of rearwardly directed, spaced, downwardly inclined lugs 36 secured as by welding to a hollow tubular transverse cross-member 37.

The vehicle lifting means 16 may comprise a pair of spaced parallel generally L-shaped lifting arms 19 preferably formed of box section tapering slightly toward the front of the lift. Each lifting arm 19 may include a horizontal portion 38 extending alongside an adjacent frame member 20 and an upwardly slightly rearwardly inclined portion 39 disposed between upstanding portions 22 and pivotally connected at 40 to the back 21. The pivotal connection 40 comprises a transverse shaft 41 journalled in the top of the upstanding portions 22. Extending between each portion 39 and sleeved over the shaft 41 may be a spacer tube or pipe 42 to maintain portions 39 in spaced relation.

At the forward end of each arm 19 is pivotally mounted as at 43 a forwardly projecting lifting extension or finger 18. Each finger 18 may be formed of a single flat plate configured at its forward end for convenient grasping of a vehicle axle or a chassis member of a vehicle to be lifted. The plate of finger 18 may be provided with longitudinally extending reenforcing ribs 44 on each side thereof, said plate extending rearwardly of pivotal connection 43 between side walls of the horizontal portion 38 of the lifting arm.

Means for connecting power means 25 and specifically the cross-member 37 with lifting means 16 may comprise a member 46 of generally triangular shape fixed to each end of cross-member 37. Each member 46 lies in a vertical plane parallel and spaced slightly from the outer surface of the inner wall of a horizontal portion 38 of the lifting arm. Each member 46 may be pivotally connected as at 47 to the adjacent lifting arm, the axis of said pivotal connection lying normally slightly rearwardly of the axis of the cross-member 37. The rearmost section of member 46 carries an outwardly extending pin 48 which extends into horizontal portion 38 through a forwardly and upwardly directed curved slot 49 formed in the inner side wall of the lifting arm. Within the box section lifting arm the inner end of pin 48 pivotally carries one end of a connecting link or rod 50, the other end of said link 50 being pivotally connected as at 51 to the rearward extension of the finger 18. In normal non-lifting position the pin 48 lies in the bottom rearmost portion of slot 49. When the lifting fingers are in initial maximum lifting position the pin 48 abuts the forward end wall of slot 49 so that forward action of the piston rod is then transmitted to the lifting arms for causing their rotation about the pivotal axis 40 on the frame structure.

In operation actuation of the control valve 32 will admit fluid under pressure to the cylinder 25 for moving the piston head and piston rod in a forward direction. The initial movement of said piston head will cause the cross-member to rotate about its pivotal connection 47 to the lifting arms. The pins 48 are slidably moved by such rotation in the slots 49 until they abut the forward end wall of said slots. During this movement of the pins 48 and the rotation of the cross-member 37 the links 50 transmit initial application of force to lifting fingers 18 to pivot said extensions about their pivotal connections 43. This pivotal movement of the lifting fingers 18 is sufficient to enable fingers 18 to engage a part of the vehicle for lifting and may initially lift the vehicle a relatively short distance.

After this initial lift is accomplished, the abutting contact of pins 48 against end walls of slots 49 limits rotation of the cross-member about its pivotal axis. Further forward movement of the piston rod causes the lifting arms 19 to rotate about the frame until a desired working height for the vehicle is reached. Such rotation of the arms causes rotation of the cylinder about trunnions 27 so that the cylinder and piston rod are raised to an upwardly directed inclined position corresponding generally to the position of the portions 38 of the lifting arms.

In raised position, automatically actuated means are provided for safely holding the arms in such position, said means being in addition to fluid pressure maintained against the piston head in the power means. The safety means may comprise a rack bar 55 extending along and parallel to the piston rod 34. Rack bar 55 may be connected at one end to the piston rod by a pair of upstanding spaced lugs 56 receiving therebetween an end of the bar 55 and secured by a bolt or pin 57. The bar 55 may be provided with a plurality of upwardly and rearwardly directed rack teeth 58 each having a rear face 59 virtually perpendicular to the axis of the bar.

A pawl 60 may be pivotally connected as at 61 to a pair of spaced ears 62 carried by the forward end wall of the cylinder above bar 55. The pawl 60 is adapted to fall by gravity into cooperative engagement with teeth 58 for abutment against faces 59 for holding the bar and piston against downward movement of the piston. Pawl 60 may be spring-biased into position if so desired.

Bar 55 moves simultaneously with the piston rod and is retractable within the cylinder through a guide port forming a bearing in the end wall of the cylinder above the piston rod. The inner end of the bar may not be connected to the piston rod, the load being transmitted through the pivotal connection 57 from the rod 34 to the bar 55. Thus the rack bar when in retracted position, is protected against dirt and foreign matter because it is housed within the cylinder.

The pawl 60 carries forwardly of its pivotal connection 61 a sidewardly extending pin 63 for engagement with release means generally indicated at 64. The release means 64 may comprise a shaft 65 rotatably mounted in a sleeve 67 carried on the forward end wall of the cylinder. The shaft 65 carries at one end a forwardly directed element 68 extending beneath pin 63 for lifting said pawl. At its other end shaft 65 is provided with a normally downwardly extending extension 69, the lower end of which may be connected to a cable 70. The cable 70 extends rearwardly through a flexible conduit 71 and terminates in a vertically disposed headed pin 72 mounted in the top of the back 21. Between the head of pin 72 and the top wall of the back may be interposed a spring 73 for biasing cable 70 into a position whereby element 68 is held in lowermost position for permitting pawl 60 to automatically fall by gravity into engagement with the teeth 58.

Thus as the lifting arms are raised and the piston rod is moved in a forward direction, pawl 60 successively engages teeth of the bar to prevent lowering of the lifting arms upon failure of the fluid pressure supply means. To release pawl 60, headed pin 72 may be pressed downwardly thereby causing element 68 on pin 65 to lift the pawl out of engagement with the rack teeth to permit retraction of the piston rod and lowering of the lifting arms.

In Figs. 6–10 is disclosed a modification of the power means shown in Figs. 1–5 for providing a fluid pressure actuated power means embodying a hydraulic safety locking means.

The power means 17' includes a cylinder 80 with a forward end wall 81 having an axial port 82 defined by oppositely directed bearing bosses 83 which slidably receive a hollow piston rod 84. The forward end of rod 84 is pivotally connected at 85 to a cross-member 37 as in the prior modification. A piston head 86 connected to the other end of rod 84 is reciprocally slidable within cylinder 80, said head carrying a seal ring 87. The piston head 86 and the rear wall or cylinder head 88 defines a pressure chamber 89 containing a suitable supply of liquid such as oil. Fluid pressure such as compressed air may be applied to the liquid through an inlet and outlet port 90 having a fitting 91 connected to a controllable pressure supply source through tube 92.

The hollow piston rod 84 telescopically carries therewithin an inner stationary hollow rod 93 connected at one end to head 88 and at its other end to an inner piston head 94 operable within rod 84 and provided with a seal ring 95. In inoperative position the inner head 94 is normally spaced from the front end wall of hollow rod 84 to provide a storage chamber 96 for liquid forwardly of piston head 94. The head 94 may be provided with an axial recess 97 for accommodating a headed axially bored securing bolt 98 having threaded engagement with inner piston rod 93, the bores of rod 93 and bolt 98 providing a passageway in communication with the chamber 96. A seal ring 99 may be provided between the head of the bolt 98 and the bottom face of recess 97.

The other end of rod 93 extends through an axial port 100 in cylinder head 88, said end being shouldered for positioning the rod against head 88.

Flow of liquid between pressure chamber 89 and storage chamber 96 is provided by a series of connected passageways or bores formed in head 88 and in communication with the bores of rod 93 and bolt 98. Positioned within the rearward end of rod 93 is a hollow sleeve 101 formed with a stepped bore 102 reduced in diameter to define a shoulder for a ball type valve 103. The valve 103 is indicated generally and operates to automatically shut off flow of liquid seeking to return from chamber 96 to chamber 89. The sleeve 101 is drilled along a suitable diameter to connect bore 102 with aligned ports 104 in the end of rod 93 for connection with an annular groove 105 formed in the inner surface of port 100.

A radially outwardly extending passageway 106 connects groove 105 with a pair of radially spaced longitudinally disposed bores 107 and 108, said bores 107 and 108 opening into the chamber 89.

Each bore 107 and 108 is progressively reduced in diameter from the outer surface of head 88 to chamber 89 by a plurality of spaced stepped shoulders. The innermost shoulder in bore 108 affords a valve seat for a ball type valve 109, said valve being generally indicated and being operable under pressure from chamber 89 to open for flow of liquid from chamber 89 to chamber 96. Means for regulating the rate of flow of liquid past valve 109 is provided by an adjusting screw 110 threaded in the outermost enlarged portion of bore 108, said screw 110 having an inwardly extending pin 111 adapted to contact and position valve 109 when open.

The bore 107 is arranged to regulate flow of liquid from chamber 96 to chamber 89. The bore 107 is provided with an adjustable needle valve 112 threaded in the outermost enlarged portion of bore 107 and having a tapered inwardly extending needle element 113 projecting into the opening formed by the innermost shoulder in bore 107. Thus adjustment of the needle valve 112 regulates the size of the innermost opening in bore 107 so as to control and regulate the rate of flow from chamber 96 to chamber 89.

Release means for liquid confined in chamber 96 by valve 103 may include an elongated release pin 115 having an enlarged portion slidable within the reduced portion of bore 102. The pin 115 includes a forwardly extending reduced end portion for flow of liquid therearound and the extremity of which is adapted to contact and inwardly displace valve 103 from its valve seat for permitting flow of fluid from chamber 96 to chamber 89. The release pin 115 may be urged inwardly by actuation of a release lever 116 eccentrically mounted about a pivot pin 117 carried on a rearwardly extending cylinder head flange 119. A cam surface is thus provided for engaging the outer end of pin 115 for urging the pin inwardly upon rotation of the lever 116.

In normal non-lifting position as indicated in Fig. 6 liquid may partially fill pressure chamber 89, the inner supply chamber 96 in the hollow piston rod 84 and the various passageways connecting chamber 96 and the chamber 88. In lifting position in Fig. 7 liquid from the pressure chamber 89 is forced through the various passageways into supply chamber 96, said liquid being urged by the pressure of compressed fluid (air) on the surface of the liquid in chamber 88. When the lifting motion stops valve 103 immediately seats on its valve seat to retain the liquid in chamber 96 and in the bore of the hollow inner piston rod 93. Lowering of the lifting means and retraction of the piston rod 84 is thus prevented by the trapped liquid in chamber 96. Valve 109 also seats against its valve seat to close bore 108.

To the lower lifting means (Fig. 8) the release lever 116 may be rotated about pin 117 so that the cam surface of the lever urges the release pin 115 inwardly to push valve 103 inwardly and from its valve seat, thus releasing liquid from chamber 96 through piston rod 93 to pressure chamber 88. The ball valve 109 closes the bore 108 and escape of liquid from supply chamber 96 is permitted only through the bore 107. The adjusting needle 112 limits the rate of flow of said liquid from chamber 96 to chamber 89 by partially closing the bore 107. Thus lowering of the lifting arms may be controlled and preset to any selected rate of speed.

It should be noted that in the power means, disclosed in Figs. 6–10 inclusive, the hydraulic means is automatically operable to lock through valve 103 the lifting arms in each position of the lifting arms during raising of the vehicle. Thus failure of pressure means actuating piston head 86 will not cause lowering of the vehicle because valve 103 immediately seats and locks the vehicle in raised position.

In a modified lever means for actuating an articulated lifting means (Figs. 11–13) lifting means, generally indicated at 130, may comprise spaced lifting arms 131 mounted on a frame structure as in the previous modification. Each lifting arm may be fabricated of channel section as shown, the end portion 132 of each lifting arm being formed of suitable structural section illustrated here as being a box cross-section.

A hollow piston rod 133 may be connected to a power means as previously described. The forward end of rod 133 may carry a U-shaped member 134 affording a pivotal connection to an I-section cross-member 135 by means of pin 136 extending through spaced lugs 137 receiving member 134. Each end of cross-member 135 may be provided with a ported lug 138. A pivot pin 139 carried by each end portion 132 extends into ported lug 138 for pivotally connecting the cross-member 135 to the spaced arms about a horizontal axis lying below and forwardly of the pivotal connection 136 of the piston rod to the cross-member.

Forwardly of the cross-member 135 a yoke 140 is pivotally connected by pivot pins 141 to the forward extremities of end portions 132, said pivotal connections being about a horizontal axis forwardly and above the axis of the pivotal connection provided by pins 139. The yoke 140 may be formed of I-cross-section and provides centrally rearwardly extending spaced lugs 142 for pivotal connection by pin 143 to one end of a centrally disposed link 144. The other end of said link 144 is received between the arms of member 134 and is pivotally connected thereto by pin 136.

Each end of yoke 140 includes a vertically disposed wall 145 and an interconnected sidewardly and outwardly spaced wall 146, said walls being ported to receive pin 141 to pivotally connect yoke 140 to each end portion 132. The spaced walls 145 and 146 define an inwardly tapering recess or socket 147 for reception of a complementary tapered end of a lifting finger or extension 148.

Each lifting finger 148 may be removably secured in said socket by means of a headed retainer pin 149 extending through aligned openings in said walls 145 and 146. The tapered end of each finger 148 may be provided with a transverse groove 140 for complementary engagement with the central portion of pin 149, the opposite side of pin 149 being provided with a recess 151 for permitting insertion of a finger 148 into said socket prior to locking of the finger therein by turning pin 149 through 180°. The pin 149 may be suitably secured against displacement by a cotter pin 152.

Each lifting finger 148 is provided at its forwardly extending end with a suitable curved configuration as at 153 for engagement with a vehicle axle or other vehicle part. In operation of this modification of the articulated lifting means it will be readily understood that the initial forward movement of the piston rod 133 rotates cross-member 135 about its pivotal connection 139 to the lifting arms. Such rotation is transmitted through the central link 144 to yoke 140 causing its rotation about pivotal connections 141 to the forward extremities of the end portions 132. This rotation causes the lifting fingers to be raised into initial engagement with a vehicle axle.

In this modification it should be noted that various sized lifting fingers may be employed depending upon the type of vehicle to be lifted, each different lifting finger having an inner tapered end formed as described to permit insertion into the sockets 147.

It will be understood that the articulated lifting arms may be differently constructed than the modifications above described. In any such articulated construction it is contemplated that the main portion of the lifting arms will remain in horizontal non-lifting position while lifting fingers carried at the ends of the arms may be actuated into raised position for initial engagement with a vehicle axle for initially lifting the vehicle. By this arrangement low-slung vehicle bodies may be raised without causing damage to intermediate vehicle parts which normally obstruct initial raising of main portions of the arms. While two modifications of the lever means for actuating the articulated lifting arms are disclosed, it is understood that the lever means may be changed in order to provide such an initial lift by the lifting fingers.

It should be noted that the arrangement of lifting arms with a relatively high pivotal connection to the back of the frame provides for lifting a vehicle end to a maximum height in order to facilitate service and repair beneath the vehicle. It should further be noted that the vehicle lift disclosed provides a laterally stable lifting arm arrangement and that the means for actuating the lifting arms is so designed as to be capable of lifting vehicles by utilizing fluid pressure sources normally found in vehicle repair and service shops. The hydraulic safety locking means is particularly advantageous in that the vehicle end may be lifted to any selected height and automatically locked at said height whereas in the pawl and rack bar arrangement a small amount of settling of the vehicle end may occur to permit engagement of the pawl with the spaced teeth.

It is understood that various modifications and changes may be made in the vehicle lift which may come within the spirit of this invention and such modifications and changes coming within the scope of the appended claims are embraced thereby.

We claim:

1. In a portable vehicle lift, the combination of: a frame comprising a pair of horizontal box-section frame members and upstanding interconnected back members at one end of said frame members; a pair of spaced box-section lifting arms pivoted to said back members adjacent to the top thereof and extending forwardly between said horizontal frame members, each lifting arm including a forwardly projecting lifting extension pivoted to the forward end of said arm; power means, including a piston rod, pivoted to said frame and operable between said arms; a transverse cross-member connected to said rod; and means connecting said cross-member to said arms and to said lifting extensions for initially lifting said extensions and for then lifting said arms; said means comprising a member fixed at each end of said cross-member and pivoted to the adjacent arm about an axis spaced from the axis of the cross-member, an upwardly and forwardly directed curved slot in said arm, a pin carried by said fixed member and slidably received in said arcuate slot for abutment with the forward end wall of said slot, and a link pivotally connected to said pin and to said extension rearwardly of and below the pivotal connection of said extension to said arm.

2. A lift as defined in claim 1 provided with safety means including a rack bar carried by said power means and movable with said piston rod, and a pawl cooperable with said rack bar and carried by said power means for maintaining said lifting arms in selected raised position.

3. A lift as defined in claim 1 wherein said power means includes hydraulic safety means cooperable with said power means for holding said lifting arms in selected position.

4. In a portable vehicle lift, the combination of: a frame structure comprising a pair of frame members and upstanding interconnected back members at one end of said frame structure; a pair of spaced interconnected lifting arms pivotally connected to said back members and lying between said frame members, each lifting arm including a lifting finger pivoted to the forward end of said arm; power means, including a piston rod, operable between said arms and pivoted to said frame structure; a transverse cross-member connected to said piston rod; and means, including lever means, connecting said cross-member to said arms and to said lifting fingers for initially lifting said fingers and for then lifting said arms.

5. In a portable lift provided with a frame structure having an upstanding back and power means pivotally connected to said frame structure adjacent said back, said power means including a forwardly directed piston rod and a transverse cross-member connected to said rod, the combination of: articulated lifting means including interconnected, spaced lifting arms pivoted to said upstanding back and lifting extensions pivoted respectively to the forward end of each arm; and means for connecting said lifting means to said cross-member, said means including lever means for first lifting said extensions and for then lifting said arms.

6. In a lift as defined in claim 5 wherein the lever means includes a pivotal connection between each end of said cross-member and the adjacent lifting arm.

7. In a lift as defined in claim 5 wherein the lever means includes a pivotal connection between each end of said cross-member and the adjacent lifting arm, and a pin carried by said cross-member cooperable with a slot in said lifting arm.

8. In a lift as defined in claim 5 wherein the lever means includes a pivotal connection between each end of said cross-member and the adjacent lifting arm, a pin carried by said cross-member cooperable with a slot in said lifting arm, and a link pivotally connected to said pin and to said lifting extension.

9. In a portable lift the combination of: a frame structure having an upstanding back; power means including a cylinder and a piston rod pivotally connected to said frame structure adjacent said back; a transverse cross-member connected to said rod; articulated lifting means including interconnected spaced lifting arms pivoted to said upstanding back and lifting extensions each pivoted to the forward end of each arm; means connecting said lifting means to said cross-member and including lever means for first lifting said extensions and for then lifting said arms; and means including a rack bar connected to and parallel to the piston rod and a pawl on the cylinder cooperable with the rack bar for holding the lifting means in raised position.

10. In a portable lift the combination of: a frame structure having an upstanding back; power means including a cylinder and a piston rod pivotally connected to said frame structure adjacent said back; a transverse cross-member connected to said rod; articulated lifting means including inter-connected spaced lifting arms pivoted to said upstanding back and lifting extensions pivoted respectively to the forward end of each arm; means connecting said lifting means to said cross-member and including lever means for first lifting said extensions and for then lifting said arms; and releasable safety means carried by the power means for holding the lifting arms in raised position.

11. In a vehicle lift as defined in claim 10 wherein the releasable safety means includes hydraulic means carried by the piston rod for automatically locking said rod in extended position.

12. In a portable vehicle lift provided with a frame having spaced horizontal members and an upstanding back, the provision of: lifting means including spaced articulated lifting arms normally lying between said horizontal members and pivotally connected to said back, said arms carrying pivotally mounted lifting fingers forwardly thereof; power means including a piston rod pivotally connected to said frame between said lifting arms; and means connecting said piston rod and said lifting means for initially actuating said lifting fingers and for then actuating said lifting arms; said connecting means including a cross member pivotally connected to said rod and to said arms; and means connecting said cross member to said lifting fingers.

13. In a portable vehicle lift provided with a frame having spaced horizontal members and an upstanding back, the provision of: lifting means including spaced articulated lifting arms normally lying between said horizontal members and pivotally connected to said back, said arms carrying pivotally mounted lifting fingers forwardly thereof; power means including a piston rod pivotally connected to said frame between said lifting arms; and means connecting said piston rod and said lifting means for initially actuating said lifting fingers and for then actuating said lifting arms; said connecting means including a cross member pivotally connected to said rod to said arms; a yoke member pivotally connected to said arms forwardly of said cross member; and a centrally disposed link pivotally connected to the cross member and to the yoke member.

14. A vehicle lift as defined in claim 13 wherein the yoke member is provided with sockets at opposite ends thereof and said fingers are provided with socket engaging portions complementary to and receivable within said sockets.

15. In a portable vehicle lift provided with a frame having spaced horizontal members and an upstanding back, the provision of: lifting means including spaced articulated lifting arms normally lying between said horizontal members and pivotally connected to said back, said arms carrying pivotally mounted lifting fingers forwardly thereof; power means including a cylinder, a piston head in said cylinder defining therewith a pressure chamber, and a hollow movable piston rod, said cylinder being pivotally connected to said frame between said lifting arms; and means connecting said piston rod and said lifting means for initially actuating said lifting fingers and for then actuating said lifting arms; said power means including hydraulic locking means comprising an inner stationary piston rod and head operable within said hollow movable piston rod and defining therewith a storage chamber; means including inter-connected passageways in said stationary rod and an end wall of the cylinder for flow of liquid between said pressure chamber and said storage chamber, and valve means in said passageways for releasably locking liquid in said storage chamber when said arms are in raised position.

16. A lift as defined in claim 15 wherein release means is carried by the end wall of the cylinder for releasing said valve means.

WILLIAM GUZEY, Jr.
JOHN CURLETT.
JAMES F. McKINEY.

No references cited.